United States Patent
Tian

(10) Patent No.: US 9,690,829 B2
(45) Date of Patent: Jun. 27, 2017

(54) DYNAMIC LOAD BALANCING DURING DISTRIBUTED QUERY PROCESSING USING QUERY OPERATOR MOTION

(71) Applicant: VMware, Inc., Palo Alto, CA (US)

(72) Inventor: Feng Tian, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 511 days.

(21) Appl. No.: 13/863,279

(22) Filed: Apr. 15, 2013

(65) Prior Publication Data

US 2014/0310259 A1   Oct. 16, 2014

(51) Int. Cl.
    *G06F 17/30*   (2006.01)

(52) U.S. Cl.
    CPC ............... *G06F 17/30545* (2013.01)

(58) Field of Classification Search
    CPC ......... G06F 17/30463; G06F 17/30433; G06F 17/30474
    USPC ........................................................ 707/718
    See application file for complete search history.

(56) References Cited

U.S. PATENT DOCUMENTS

| | | | |
|---|---|---|---|
| 6,691,101 B2 | 2/2004 | MacNicol et al. | |
| 7,657,540 B1 | 2/2010 | Bayliss | |
| 7,664,806 B1 * | 2/2010 | Koudas | G06F 17/30545 707/899 |
| 8,032,927 B2 | 10/2011 | Ross | |
| 8,417,689 B1 * | 4/2013 | Waas et al. | 707/713 |
| 2003/0037048 A1 * | 2/2003 | Kabra | G06F 17/30445 |
| 2004/0088412 A1 * | 5/2004 | John et al. | 709/226 |
| 2005/0080765 A1 | 4/2005 | Dettinger et al. | |
| 2005/0222965 A1 | 10/2005 | Chaudhuri et al. | |
| 2008/0028095 A1 * | 1/2008 | Lang | G06F 17/30516 709/232 |
| 2009/0043745 A1 | 2/2009 | Barsness et al. | |
| 2009/0192981 A1 | 7/2009 | Papaemmanouil et al. | |
| 2010/0030741 A1 * | 2/2010 | Johnson | G06F 17/30457 707/718 |
| 2011/0228668 A1 | 9/2011 | Pillai et al. | |
| 2011/0314019 A1 * | 12/2011 | Jimenez Peris et al. | 707/737 |

(Continued)

OTHER PUBLICATIONS

Chandy et al., "Distributed Snapshots: Determining Global States of Distributed Systems", ACM Transactions on Computer Systems, vol. 3, No. 1, Feb. 1985, pp. 63-75.

(Continued)

*Primary Examiner* — Scott A Waldron
*Assistant Examiner* — Dongming Wang

(57) ABSTRACT

Techniques for performing dynamic load balancing during distributed query processing are provided. In one embodiment, a first processing node in a plurality of processing nodes can execute an instance of a query operator, where the query operator is part of a query plan for a database query that is processed in a distributed manner by the plurality of processing nodes. The first processing node can further monitor its load level while the executing occurs. If the load level exceeds a threshold, the first processing node can split an amount of remaining work that is associated with the executing into a first portion and a second portion, determine state information for moving execution of the second portion from the first processing node to a second processing node, and save the state information to a distributed data store.

21 Claims, 10 Drawing Sheets

(56) References Cited

U.S. PATENT DOCUMENTS

| | | | |
|---|---|---|---|
| 2011/0320410 A1* | 12/2011 | Marum | G06F 17/30448 707/687 |
| 2013/0227562 A1* | 8/2013 | Tsirkin et al. | 718/1 |
| 2014/0095471 A1 | 4/2014 | Deshmukh et al. | |

OTHER PUBLICATIONS

Pavlo et al., "A Comparison of Approaches to Large-Scale Data Analysis", SIGMOD '09, Jun. 29-Jul. 2, 2009, Providence, Rhode Island, 14 pages.

TPC Benchmark H, Standard Specification, Revision 2.15.0, 1993-2013 Transaction Processing Performance Council, 136 pages, http://www.tpc.org/tpch/, retrieved Apr. 15, 2013.

"Welcome to Hive", The Apache Software Foundation, 2 pages, http://hive.apache.org/, retrieved Apr. 15, 2013.

"Running TPC-H Queries on Hive", 3 pages, https://issues.apache.org/jira/browse/HIVE-600, retrieved Apr. 15, 2013.

"What is Apache Mahout?", 2 pages, http://mahout.apache.org/, retrieved Apr. 15, 2013.

"Welcome to Apache Pig!", 2 pages, http://pig.apache.org/, retrieved Apr. 15, 2013.

"Running TPC-H Benchmark on Pig", 4 pages, https://issues.apache.org/jira/browse/PIG-2397, retrieved Apr. 15, 2013.

"Welcome to Apache ZooKeeper", 2 pages, http://pzookeeper.apache.org/, retrieved Apr. 15, 2013.

Greenplum TPC-H results, GP/SNE v.s Postgres 8.4.2, 22 Queries of TPC-H, 2 pages, http://www.greenplum.com/communities/, retrieved Apr. 15, 2013.

Office Action Dated Feb. 17, 2016; U.S. Appl. No. 13/863,263; (17 pgs.).

Office Action Dated Aug. 25, 2016; U.S. Appl. No. 13/863,263; (24 pgs.).

Office Action Dated Nov. 16, 2016; U.S. Appl. No. 13/863,263; (19 pgs.).

* cited by examiner

DYNAMIC LOAD BALANCING DURING DISTRIBUTED QUERY PROCESSING USING QUERY OPERATOR MOTION

BACKGROUND

Distributed query processing refers to the task of executing a database query across a collection of distinct processing nodes, such as computer systems connected via a computer network. One framework for implementing distributed query processing is known as a parallel data warehouse. In a typical parallel data warehouse, each processing node is a dedicated, high-end server that maintains a local storage component. The local storage component stores a subset, or partition, of the data in the parallel data warehouse. When the parallel data warehouse receives a database query, an optimizer of the parallel data warehouse translates the query into a tree of relational query operators referred to as a query plan. The optimizer then divides the query plan into sections and schedules each section for execution on one or more of the processing nodes. At query runtime, data flows from the database tables (as stored in the server-specific storage components) and between the various processing nodes according to the hierarchical structure of the query plan. The processing node(s) executing the top-most (i.e., root) section of the query plan then output the final result of the query.

Parallel data warehouses generally provide better performance than other existing distributed query processing solutions, and thus are widely used for data-intensive and complex query workloads. However, parallel data warehouses also suffer from a number of limitations. For example, since a typical parallel data warehouse is composed of high-end servers, the hardware costs for deploying and maintaining such a warehouse are relatively high. Further, due to the manner in which data flows directly from one processing node to another, parallel data warehouses are not robust against processing node failures; if any of the processing nodes fail during a long running query, the entire query must be completely restarted. Yet further, the optimizer of a parallel data warehouse only schedules the execution of query plan sections on processing nodes prior to starting a query; once query execution begins, this scheduling cannot be changed. As a result, there is no way to dynamically reallocate work among the scheduled processing nodes (or to new processing nodes) to account for, e.g., data skew in the input data, fluctuating compute/memory resources, and/or other runtime factors that may unexpectedly slow down query processing.

Another framework for implementing distributed query processing is known as the MapReduce (MR) model. Unlike a parallel data warehouse, an MR system generally utilizes a large number of heterogeneous, relatively inexpensive processing nodes (e.g., desktop computers) that share access to a single, distributed cloud of data (e.g., a distributed file system). When an MR system receives a database query, the system decomposes the query into a series of jobs referred to as "map" or "reduce" jobs. Each job is allocated to one or more of the processing nodes. To enable data passing, each processing node writes the results of its job as a set of files to the cloud. These files are then read from the cloud by other processing nodes whose jobs are dependent on the previous job. This process continues until all of the jobs have completed, at which point a final query result is available.

Since MR systems can be implemented with commodity machines, such systems are attractive from a cost perspective and can leverage existing computing infrastructures. In addition, MR systems handle processing node failures more gracefully than parallel data warehouses. For example, if a particular processing node in an MR cluster fails, there is no need to roll back the jobs completed by other processing nodes in the cluster because the results generated by those processing nodes are saved in the cloud; the only work that needs to be restarted is the specific job assigned to the failed processing node. On the other hand, one disadvantage of the MR model is that the process of saving job results imposes a performance penalty due to disk I/O; this penalty can be very significant if the result size for a particular job is large. Moreover, MR systems cannot dynamically reschedule jobs on different processing nodes once query execution begins, and thus suffer from the same limitations as parallel data warehouses when encountering data skew, fluctuating compute/memory resources, and other similar conditions at query runtime.

SUMMARY

Techniques for performing dynamic load balancing during distributed query processing are provided. In one embodiment, a first processing node in a plurality of processing nodes can execute an instance of a query operator, where the query operator is part of a query plan for a database query that is processed in a distributed manner by the plurality of processing nodes. The first processing node can further monitor its load level while the executing occurs. If the load level exceeds a threshold, the first processing node can split an amount of remaining work that is associated with the executing into a first portion and a second portion, determine state information for moving execution of the second portion from the first processing node to a second processing node, and save the state information to a distributed data store.

The following detailed description and accompanying drawings provide a better understanding of the nature and advantages of particular embodiments.

DETAILED DESCRIPTION

Figure 1:
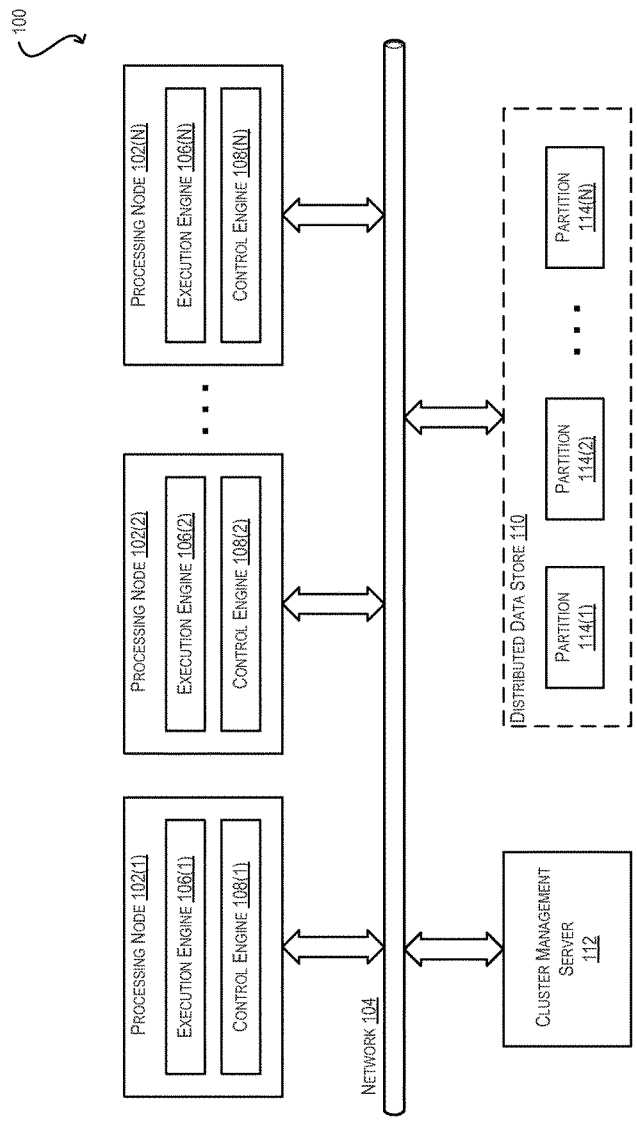
FIG. 1 depicts a system environment according to one embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes an improved framework for distributed query processing. In one embodiment, the framework can receive a database query (e.g., an SQL query), determine a query plan based on the received query, and schedule execution of the query plan across a group (i.e., cluster) of processing nodes. As part of the scheduling process, the framework can assign one query operator in the query plan to each processing node. The framework can then execute the query plan in a manner that allows for "query operator motion"—in other words, the dynamic movement, or migration, of query operator instances between processing nodes at runtime.

In certain embodiments, this query operator motion capability can provide fault tolerance against processing node failures. For example, during query plan execution, each processing node can generate a periodic snapshot of the query operator instance running on the processing node and write the snapshot to a distributed data store. The snapshot can include, e.g., state information useable for moving execution of the query operator to another processing node. If a particular processing node subsequently fails, a management component of the cluster can detect the failure and allocate a new processing node to take over the duties of the failed processing node. The new processing node can then retrieve, from the distributed data store, the snapshot of the query operator instance that was previously running on the failed processing node and initiate a new instance of the query operator based on the loaded snapshot (thereby effectively migrating the query operator instance to the new processing node). With this approach, the execution of the query operator can be resumed on the new processing node as of the time of the snapshot, without needing to roll back the entire query.

In further embodiments, query operator motion can enable dynamic load balancing between processing nodes. For example, during query plan execution, each processing node can monitor its load levels (e.g., memory utilization, CPU utilization, etc.) while executing its assigned query operator. If a particular processing node determines that one of its load levels has exceeded a predefined threshold, the processing node can split off a portion of work remaining to be performed for the query operator and write state information identifying the split portion to the distributed data store. Another processing node (e.g., a previously scheduled node or a new node) can subsequently load the state information and take over processing of the split portion, thereby lightening the load on the original processing node.

In both the failure recovery and load balancing scenarios above, the query operator state information that each processing node generates and writes to the distributed data store can be specific to the type of the query operator. For instance, if the query operator is a select/scan operator, the state information can comprise a file offset indicating the current position of the scan. On the other hand, if the query operator is a hash join operator that joins two database tables, the state information can comprise a hash table of entries from the first (e.g., left-side) database table and an offset into the second (e.g., right-side) database table. By tailoring state information based on query operator type, the processing nodes can minimize the amount of data that needs to be saved to (and subsequently read from) the distributed data store.

In addition to the foregoing features, the framework described herein can incorporate certain advantageous characteristics of existing MR systems and parallel data warehouses. For example, in one embodiment, the framework can make use of heterogeneous, commodity machines (e.g., desktop computers) as processing nodes, thus retaining the cost benefits of the MR model. In a further embodiment, the framework can allow for direct message passing between processing nodes (rather than writing intermediate job results to disk), thus retaining the superior performance/speed of parallel data warehouses.

System Overview

FIG. 1 depicts a system environment 100 that supports distributed query processing with query operator motion according to an embodiment. As shown, system environment 100 includes a cluster of processing nodes 102(1)-102(N) that are communicatively coupled via a network 104. Each processing node 102(1)-102(N) includes an execution engine 106(1)-106(N) for executing a portion of a query plan (e.g., a query operator) and a control engine 108(1)-108(N) for managing the operation of the node. The specific functions performed by these engines are described in further detail below. Processing nodes 102(1)-102(N) can correspond to physical machines (e.g., desktop/laptop computers, server computers, etc.) or virtual machines running within one or more physical machines in a virtualized environment. In the former case, processing nodes 102(1)-102(N) can be implemented using a heterogeneous group of relatively inexpensive, commodity computers, such as the off-the-shelf computers typically used in an MR cluster.

In addition to processing nodes 102(1)-102(N), system environment 100 includes a distributed data store 110 and a cluster management server 112. Distributed data store 110 maintains the dataset of system environment 100 (i.e., the data to be queried) and can be implemented using any type of distributed storage technology known in the art, such as a distributed database, a distributed file system, etc. In the embodiment of FIG. 1, distributed data store 110 includes a number of partitions 114(1)-114(N) that match the number of processing nodes 102(1)-102(N). In this embodiment, each partition 114(1)-114(N) can be physically located on a particular processing node 102(1)-102(N). In alternative implementations, distributed data store 110 can comprise any number of partitions that are spread across processing nodes 102(1)-102(N) and/or located on separate, dedicated storage servers.

Cluster management server 112 is responsible for managing the lifecycle of processing nodes 102(1)-102(N) and orchestrating the query execution process. For example, cluster management server 112 can receive a database query from, e.g., a user or an automated agent and can invoke an optimizer component (not shown) to generate a query plan for the database query. The generated query plan comprises a tree of relational query operators (e.g., select/scan operators, join operators, aggregate operators, etc.) that define a blueprint for processing the query. Cluster management server 112 can then schedule the query plan for execution across execution engines 106(1)-106(N) of processing nodes 102(1)-102(N). In a particular embodiment, cluster management server 112 can schedule each execution engine 106(1)-106(N) to execute exactly one query operator from the query plan. Once execution engines 106(1)-106(N) have completed their query operator processing, cluster management server 112 can collect the query results and return the results to the requestor.

As noted in the Background section, existing distributed query processing solutions suffer from a number of limitations, such as a poor failure model (in the case of parallel data warehouses) and static workload scheduling among processing nodes (in the case of both parallel data warehouses and MR systems). To address these and other similar issues, the various components of system environment 100 (e.g., cluster management server 112, execution engines 106(1)-106(N), and control engines 108(1)-108(N)) can interoperate in a manner that allows for query operators to move, or migrate, from one execution engine to another at runtime. As described in the sections that follow, this query operator motion can be used to handle processing node failures more gracefully than previously possible, as well as enable dynamic load balancing among execution engines/processing nodes.

Exemplary Query Plan and Scheduling/Execution Flows

Figure 2:
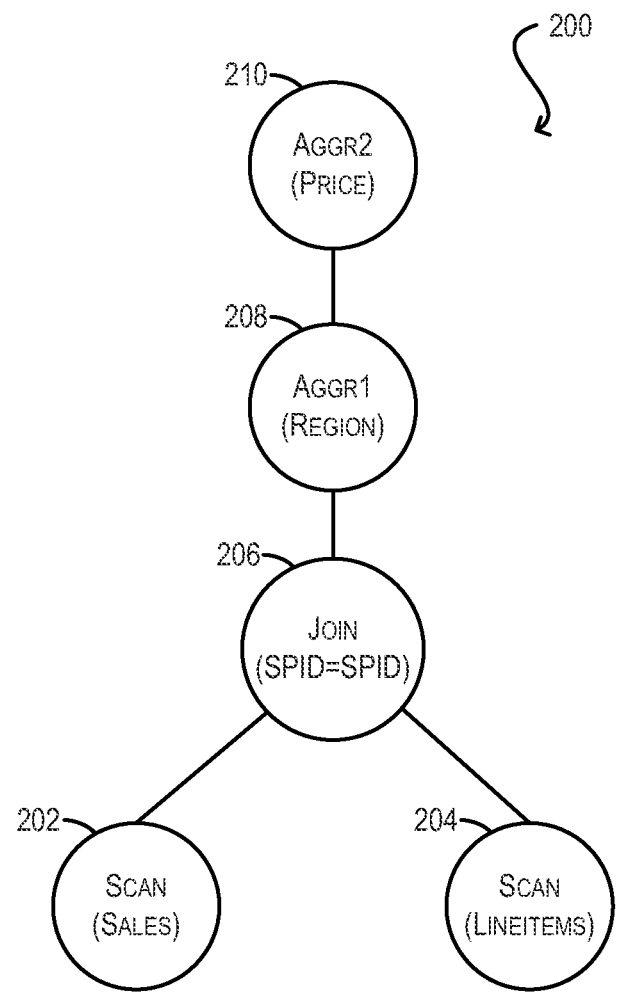
FIG. 2 depicts an exemplary query plan according to one embodiment.
Figure 3:
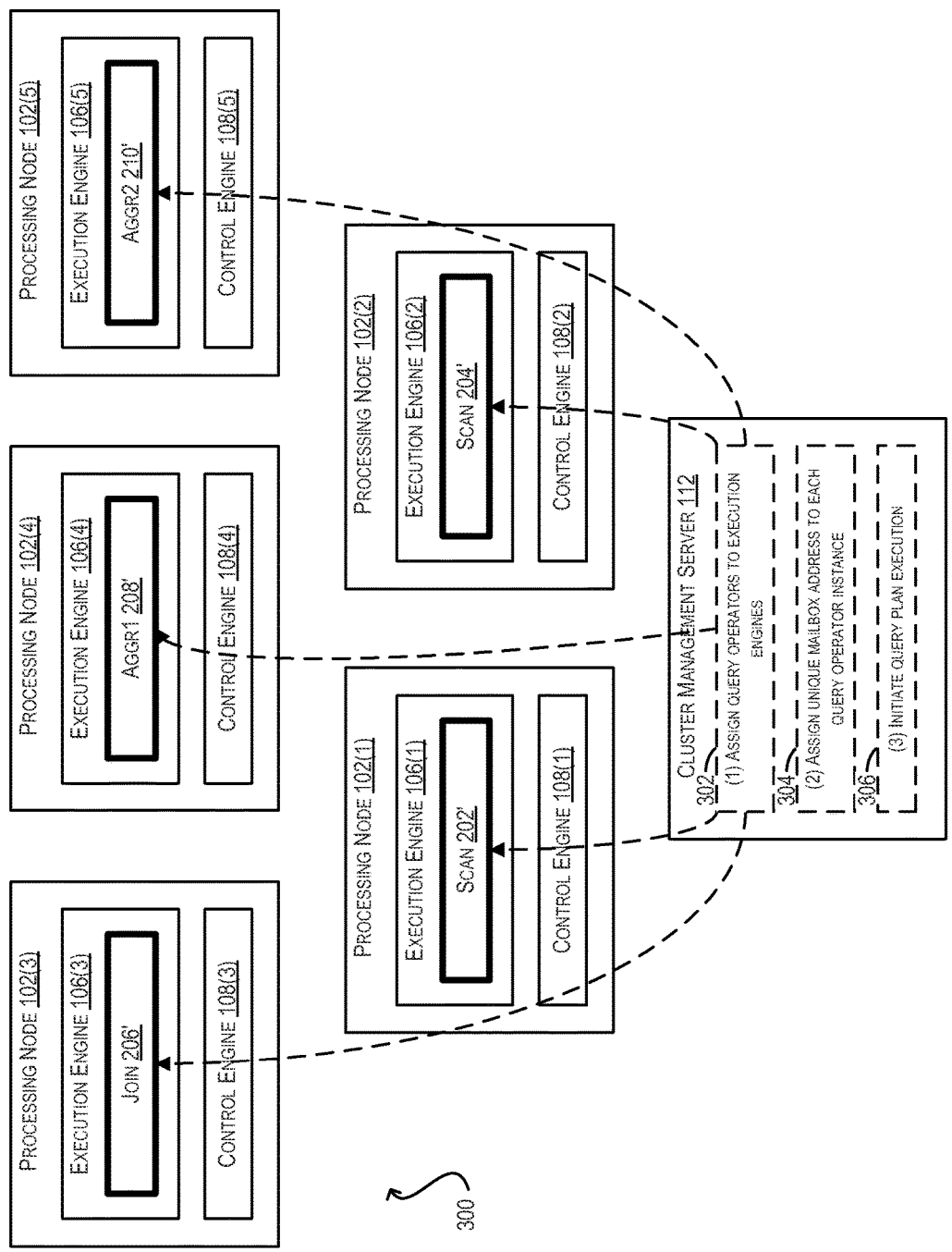
FIGS. 3 and 4 depict a system environment and a flow diagram respectively for executing the query plan of FIG. 2 according to one embodiment.
Figure 4:
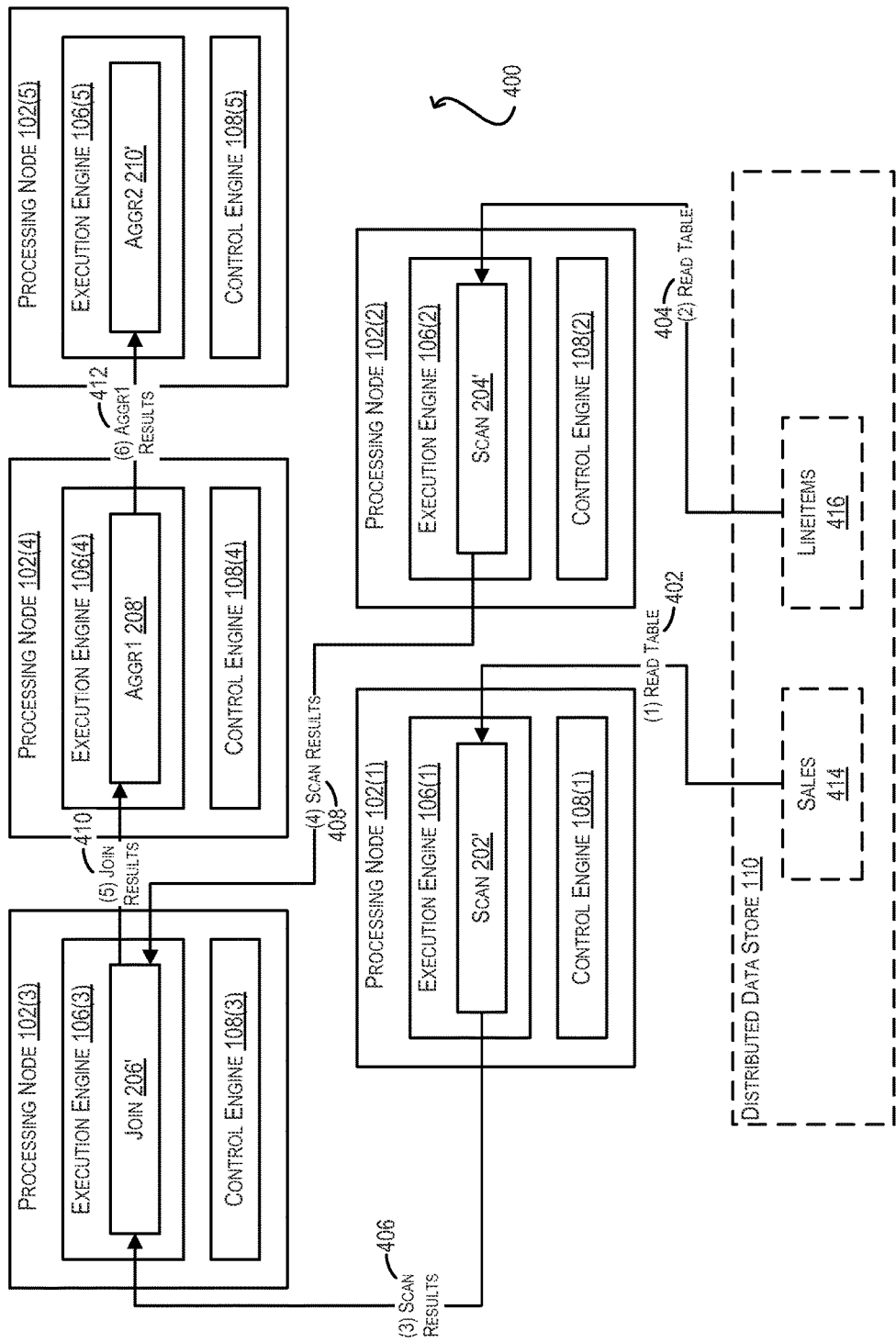

FIGS. 2-4 depict an exemplary query plan 200 and flows 300/400 within system environment 100 for scheduling/executing query plan 200 according to an embodiment. These figures provide a more detailed explanation of how system environment 100 may operate in a typical query processing scenario.

Starting with reference to FIG. 2, query plan 200 reflects an exemplary plan that the optimizer component of cluster management server 112 can generate upon receiving the following SQL query:

---
SELECT S.Region, SUM(L.Price)
FROM Lineitems L, Sales S
WHERE L.SPID = S.SPID
GROUP BY S.Region
---

As shown, query plan 200 includes five nodes that are arranged in a hierarchical (i.e., tree) format, each node corresponding to a query operator 202-210. The two leaf nodes correspond to scan operators 202 and 204 for database tables "Lineitems" and "Sales" respectively. Generally speaking, these scan operators are responsible for reading the entries (i.e., rows) of their respective tables so that those entries can be processed by upstream query operators.

The next (parent) node in the query plan tree corresponds to a join operator 206. Join operator 206 is configured to receive the output from scan operators 202 and 204 and match together entries from the Lineitems and Sales tables that share the same value in the "SPID" column. Join operator 206 can be implemented using a number of different algorithms such as a hash join, a merge join, etc.

The next (parent) node in the query plan tree corresponds to a first aggregate ("aggr1") operator 208. Aggr1 operator 208 is configured to group together the matching entries from join operator 206 that share the same value in the "Region" column. For example, aggr1 operator 208 can group together all of the entries for region "North America," all of the entries for region "Asia Pacific," and so on.

The final (root) node in the query plan tree corresponds to a second aggregate ("aggr2") operator 210. Aggr2 operator 210 is configured to take the grouped entries output by aggr1 operator 208 and calculate a sum on the "Price" column for each group. For example, aggr2 operator 210 can generate a single aggregate price for all of the entries for region "North America," a single aggregate price for all of the entries for region "Asia Pacific," etc. This per-region, aggregate price is provided as the output of the query (indicated by the SELECT statement "S.Region, SUM(L.Price)").

Once query plan 200 has been generated, cluster management server 112 can schedule query plan 200 for execution across execution engines 106(1)-106(N)/processing nodes 102(1)-102(N) of system environment 100 as shown in flow 300 of FIG. 3. At step (1) of flow 300 (reference numeral 302), cluster management server 112 can assign query operators 202-210 to execution engines 106(1)-106(5) of processing nodes 102(1)-102(5) respectively, such each execution engine 106(1)-106(5) is responsible for executing an instance of a single query operator of query plan 200. For example, scan operator 202 is shown as being assigned to execution engine 106(1) (in the form of scan operator instance 202'), scan operator 204 is shown as being assigned to execution engine 106(2) (in the form of scan operator instance 204'), join operator 206 is shown as being assigned to execution engine 106(3) (in the form of join operator instance 206'), aggr1 operator 208 is shown as being assigned to execution engine 106(4) (in the form of aggr1 operator instance 208'), and aggr2 operator 210 is shown as being assigned to execution engine 106(5) (in the form of aggr2 operator instance 210').

Although FIG. 3 depicts a one-to-one mapping between query operators 202-210 and execution engines 106(1)-106(5), in certain embodiments cluster management server 112 may assign a query operator to multiple execution engines (resulting in multiple instances of the same query operator). This may occur if, for instance, cluster management server 112 determines that a single processing node cannot adequately handle all of the processing required by the query operator.

At step (2) (reference numeral 304), cluster management server 112 can assign a unique "mailbox" address to each query operator instance 202'-210'. As described with respect to FIG. 4 below, these mailbox addresses enable query operator instances 202'-210' to communicate with each other at query runtime using a direct messaging scheme (rather than having to write job results to disk as in the MR model). Cluster management server 112 can then initiate query plan execution (step (3), reference numeral 306).

FIG. 4 depicts a flow 400 that can be performed by query operator instances 202'-210' running in execution engines 106(1)-106(N) for executing query plan 200 in response to the initiation command at step (3) of flow 300. At steps (1) and (2) of flow 400 (reference numerals 402 and 404), scan operator instances 202' and 204' running in execution engines 106(1) and 106(2) can read entries from Sales table 414 and Lineitems table 416 respectively (as stored in distributed data store 110). While Sales table 414 and Lineitems table 416 are shown as singular entities, the data in these tables may be physically spread across multiple partitions (e.g., 114(1)-114(N)) of distributed data store 110.

At steps (3) and (4) (reference numerals 406 and 408), scan operator instances 202' and 204' can stream their scan results to the mailbox address of join operator instance 206' running in execution engine 106(3). In response, join operator instance 206' can perform its designated join processing on the received scan results. In certain embodiments, join operator instance 206' can operate in parallel with scan operator instances 202' and 204', such that join operator instance 206' processes the scan results from scan operator instances 202' and 204' as they are received (i.e., on a real-time, or near real-time basis). The extent to which these query operator instances can run in parallel will generally be contingent on the data dependencies between their algorithms. In alternative embodiments, join operator instance 206' can buffer the scan results and wait for all results to be received before initiating join processing.

At step (5) (reference numeral 410), join operator instance 206' can stream its join results to the mailbox address of aggr1 operator instance 208' running in execution engine 106(4). In response, aggr1 operator instance 208' can perform its designated aggregation operation on the received join results (in this case, a group by operation). Like join operator instance 206', aggr1 operator instance 208' can operate in parallel with the other query operator instances to the extent possible.

Finally, at step (6) (reference numeral 412), aggr1 operator instance 208' can stream its join results to the mailbox address of aggr2 operator instance 210' running in execution engine 106(5). In response, aggr2 operator instance 210' can perform its designated aggregation operation on the received results (in this case, a SUM operation). Like join operator instance 206' and aggr1 operator instance 208', aggr2 operator instance 210' can operate in parallel with the other query operator instances to the extent possible. Aggr2 operator instance 210' can then output the final results for the query (either by writing the results to distributed data store 110 or transmitting the results to cluster management server 112).

Fault Tolerance Using Query Operator Motion

Figure 5:
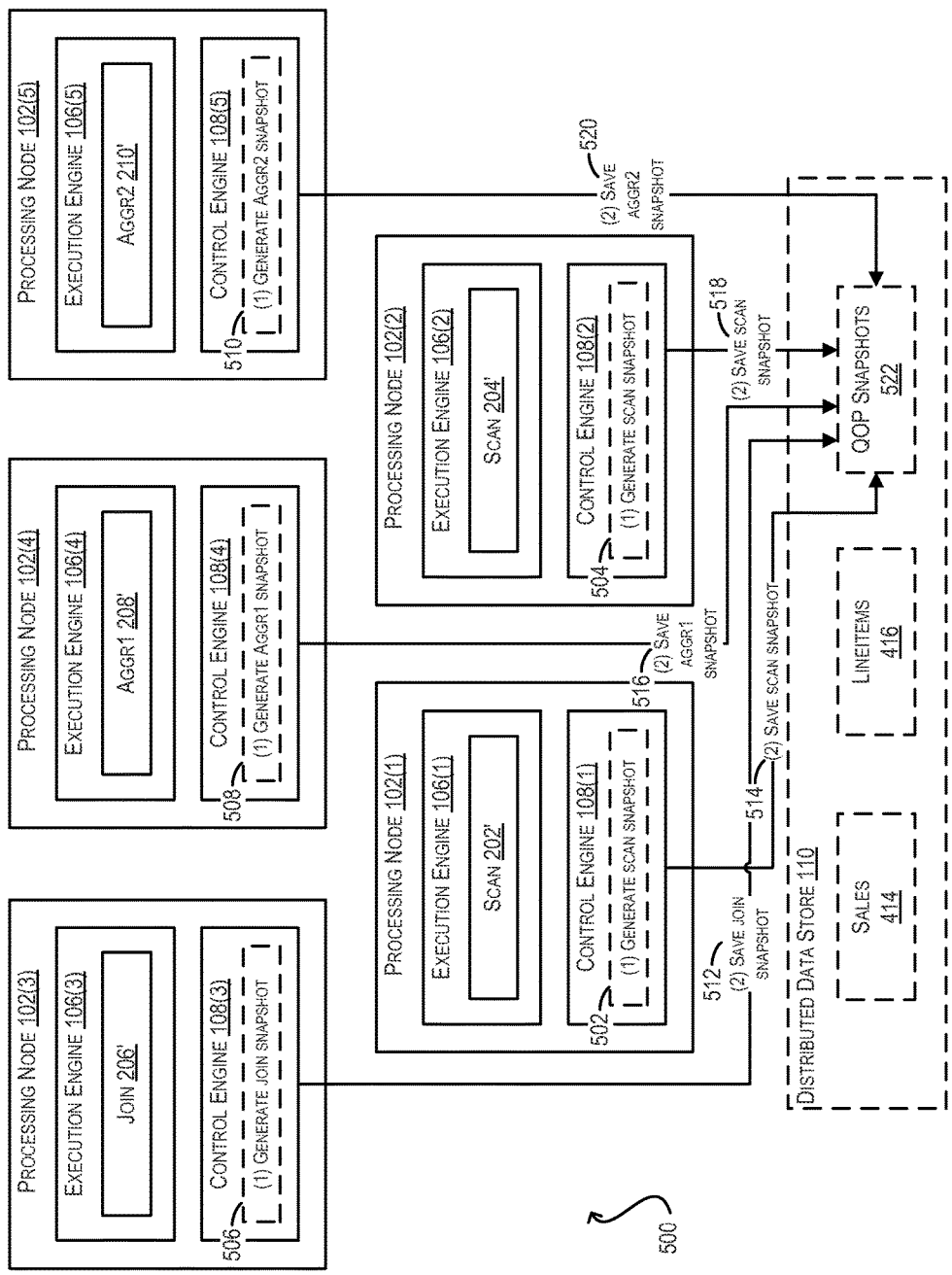
FIG. 5 depicts a flow for generating/saving query operator snapshots according to one embodiment.
Figure 6:
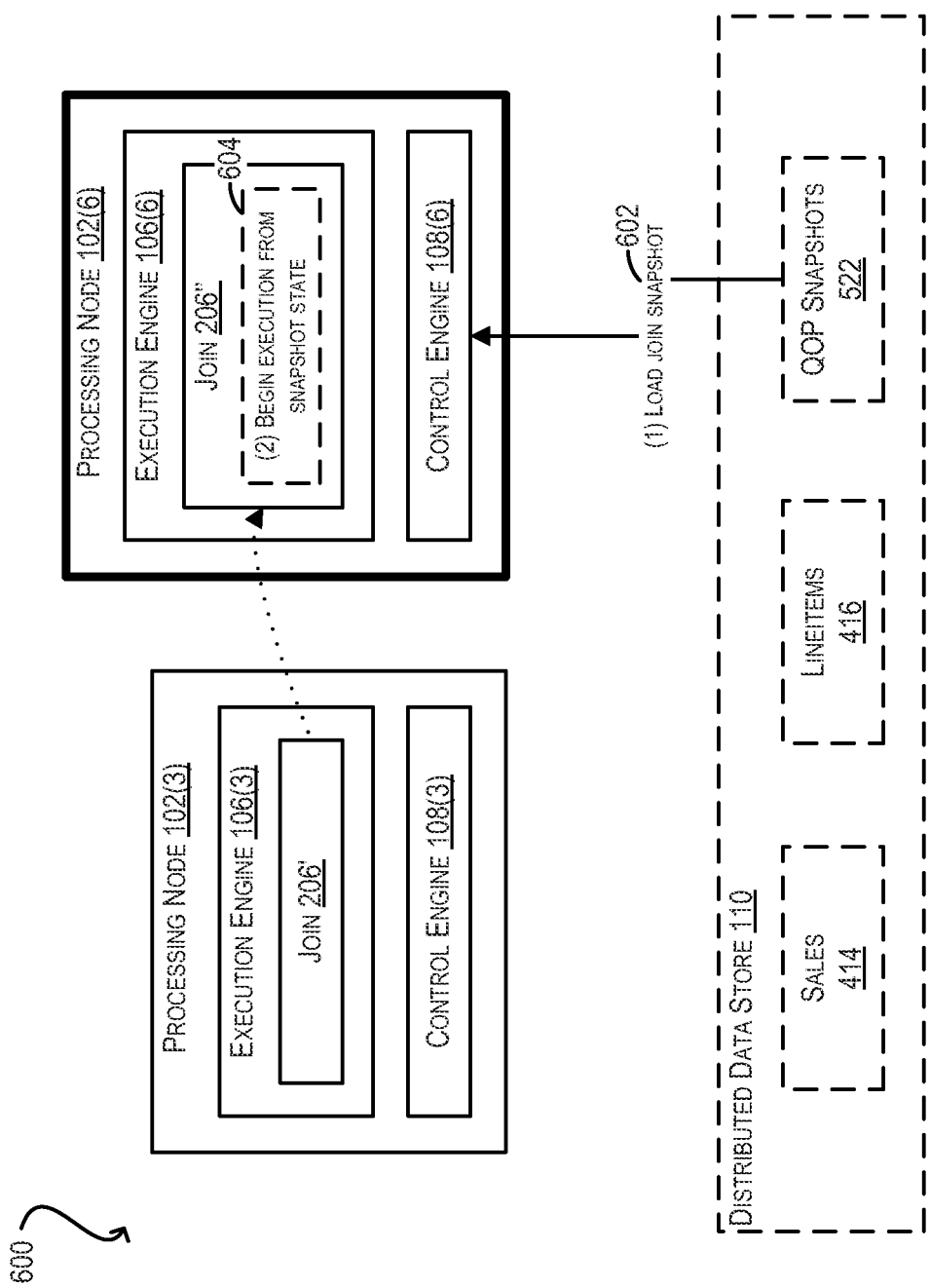
FIG. 6 depicts a flow for migrating execution of a query operator after a processing node failure according to one embodiment.

As discussed with respect to FIG. 1, a significant feature supported by system environment 100 is query operator motion—in other words, the dynamic movement of query operators from one execution engine to another at query runtime. FIGS. 5 and 6 depict flows 500 and 600 that illustrate how query operator motion can enable fault tolerance against processing node failures according to an embodiment. In particular, flows 500 and 600 of FIGS. 5 and 6 can be performed during query plan execution flow 400 of FIG. 4, and can allow query operator instances 202'-210' to automatically migrate between execution engines 106(1)-106(N)/processing nodes 102(1)-102(N) in the case of a processing node failure (thereby avoiding the need to restart execution of query plan 200 from scratch).

Starting with reference to flow 500 of FIG. 5, at step (1) (reference numerals 502-510), control engines 108(1)-108(5) of processing nodes 102(1)-102(N) can generate snapshots of query operator instances 202'-210' currently running in respective execution engines 106(1)-106(N). For example, control engine 108(1) can generate a snapshot of scan operator instance 202' running in execution engine 106(1), control engine 108(2) can generate a snapshot of scan operator instance 204' running in execution engine 106(2), control engine 108(3) can generate a snapshot of join operator instance 206' running in execution engine 106(3), control engine 108(4) can generate a snapshot of aggr1 operator instance 208' running in execution engine 106(4), and control engine 108(5) can generate a snapshot of aggr2 operator instance 210' running in execution engine 106(5). For a long running query, control engines 108(1)-108(N) can generate these snapshots at periodic intervals (e.g., every 5 minutes, 10 minutes, 30 minutes, etc.).

Each snapshot can include state information that is usable for moving the query operator instance from its current execution engine/processing node to another execution engine/processing node. For instance, the snapshot can include an indication of the results the query operator instance has generated so far and an indication of the input data that the query operator instance has yet to process. In a particular embodiment, the state information included in the snapshot can be customized based on the type of the query operator instance (e.g., select/scan, join, aggregate, etc.), thereby minimizing the size of the snapshot (discussed with respect to FIG. 7 below).

Further, the snapshots generated by control engines 108(1)-108(N) can be consistent with each other (i.e., can reflect the state of each query operator instance 202'-210' as of the exact same point in time). Control engines 108(1)-108(N) can ensure this consistency by implementing a known distributed snapshot algorithm, such as the Chandy-Lamport algorithm.

At step (2) of flow 500 (reference numerals 512-520), control engines 108(1)-108(N) can save the snapshots generated at step (1) to a location on distributed data store 110 (e.g., QOP snapshots 522). In cases where control engines 108(1)-108(N) will generate multiple snapshots per query operator instance over the lifetime of the query, control engines 108(1)-108(N) can save only the latest snapshot at step (2).

Turning now to FIG. 6, flow 600 illustrates a scenario where processing node 102(3) has failed after the snapshot generation flow of FIG. 5. In this scenario, it is assumed that cluster management server 112 (or some other entity within system environment 100) has detected the failure and has allocated a new processing node 102(6) (with a new execution engine 106(6) and a new control engine 108(6)) for taking over the duties of failed processing node 102(3).

At step (1) of flow 600 (reference numeral 602), control engine 108(6) of new processing node 102(3) can access QOP snapshots 522 in distributed data store 110 and load the snapshot previously saved by control engine 108(3) of failed processing node 102(3).

Once the snapshot is loaded, execution engine 108(6) of new processing node 102(6) can initiate execution of a new instance (206") of join operator 206 previously running on failed processing node 102(3), such that new join operator instance 206" begins its processing as of the time of the snapshot (step (2), reference numeral 604). In this manner, join operator 206 is effectively migrated from failed processing node 102(3) to new processing node 102(6) (shown by the dotted arrow from 102(3) to 102(6)), without requiring a restart of the entire query plan execution flow.

In some situations, the initiation of new join operator instance 206" from the snapshot state may cause other query operator instances that depend on the join operator (e.g., scan operator instances 202' and 204') to rollback to the same snapshot. However, this issue can be mitigated by taking frequent snapshots, which will minimize the amount of work than needs to be repeated. Further, as described with respect to FIG. 8 below, in certain embodiments control engines 108(1)-108(6) can incorporate logic for detecting the "horizon" of a failure event—in other words, the point at which a rollback of a particular query operator no longer affects the work already performed by other dependent query operators. By detecting this failure horizon, the control engines can prevent a rollback from cascading down to query operators at the leaf nodes of the query plan tree.

Figure 7:
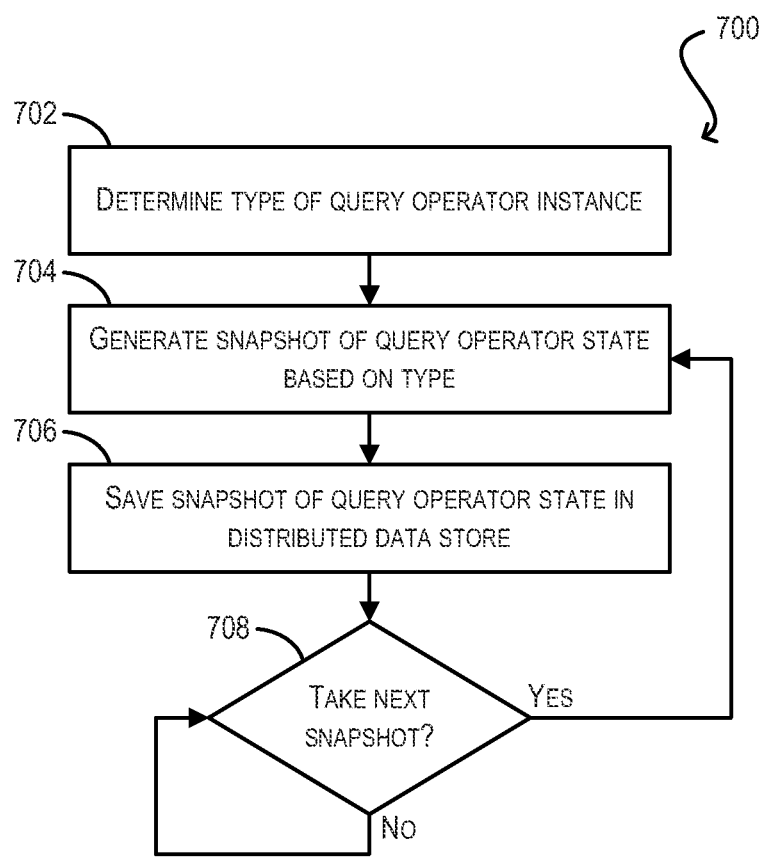
FIG. 7 depicts a flowchart that provides additional details regarding the flow of FIG. 5 according to one embodiment.

FIG. 7 depicts a flowchart 700 that provides additional details regarding the snapshot generation flow of FIG. 5 according to an embodiment. At block 702, control engine 108(1)-108(5) can determine the type of the query operator instance currently executing in the control engine's corresponding execution engine 106(1)-106(5). For instance, the control engine can determine that the query operator instance corresponds to a select/scan operator, a hash join operator, etc.

At block 704, control engine 108(1)-108(5) can generate a snapshot of the query operator state. As noted previously, this snapshot can include state information usable for moving execution of the query operator to another execution engine/processing node in the event of a node failure. In a particular embodiment, control engine 108(1)-108(5) can generate the snapshot based on the query operator type determined at block 702, such that the state information included the snapshot is specific to the query operator type.

This state information customization can ensure that the size of the snapshot is kept as small as possible, since the snapshot will only include data needed to migrate the determined query operator type (and not other query operator types).

The following table provides an exemplary list of query operator types and the state information that may be included in the snapshot for that type:

TABLE 1

Snapshot State Information for Various Query Operator Types

| Query Operator Type | State Information |
| --- | --- |
| Select/Scan | The position (e.g., file offset) of the scanner with respect to the input data. |
| Hash Join | A hash join operator has two phases-the first phase builds a hash table for the left-side input and the second phase probes the hash table for each entry from the right-side input. Thus, the state information comprises the hash table and the right-side offset. |
| Hash Aggregate (e.g., group by, sum, etc.) | Like hash join, a hash aggregate operator builds a hash table and then iterates over the hash table entries. Accordingly, the state information comprises the hash table and the current offset into the hash table. Note that the hash table does not need to contain all of the input data (like the build phase of hash join); it only needs to record the transit state of each aggregate function. For example, for the sum( ) function, only the current sum of each group needs to be recorded. |
| Sort | Sort buffer. |

Once the snapshot is created, control engine 108(1)-108(5) can save the snapshot in distributed data store 110 (block 706). If a previous snapshot already exists in distributed data store 110 for the query operator instance, control engine 108(1)-108(5) can save the delta between the current snapshot and the previous snapshot, thereby minimizing the amount of data that needs to be written.

Control engine 108(1)-108(5) can then enter a loop at block 708 and wait for a preconfigured time interval (e.g., 5 minutes, 10 minutes, 30 minutes, etc.) until the next snapshot. Once the time interval has passed, the processing of flow 700 can return to block 704 and the remaining steps can be repeated until query plan execution is complete.

Figure 8:
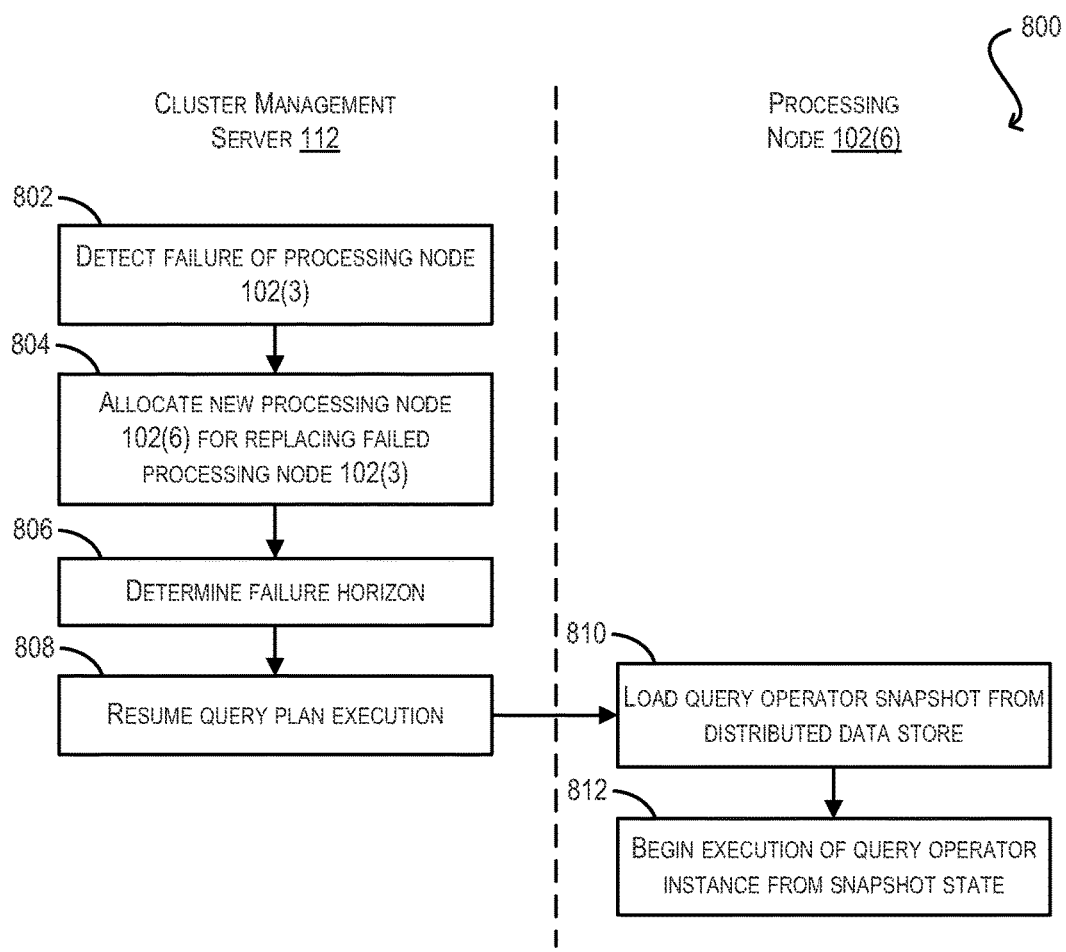
FIG. 8 depicts a flowchart that provides additional details regarding the flow of FIG. 6 according to one embodiment.

FIG. 8 depicts a flowchart 800 that provides additional details regarding the failure recovery flow of FIG. 6 according to an embodiment. At block 802, cluster management server 112 can detect the failure of processing node 102(3) during the execution of query plan 200. In one embodiment, cluster management server 112 can detect this failure by, e.g., sending a health check packet to processing node 102(3) and determining that no reply to the health check packet is received within a predetermined period of time. In alternative embodiments, other detection mechanisms can be employed.

At block 804, cluster management server 112 can allocate new processing node 102(6) for replacing failed processing node 102(3). As part of this step, cluster management server 112 can assign join operator 206 previously running on failed processing node 102(3) (as join operator instance 206') to new processing node 102(6) (as new join operator instance 206"). In addition, cluster management server 112 can assign a unique mailbox address to new join operator instance 206".

At block 806, cluster management server 112 can determine the "horizon" of the failure of processing node 102(3). In other words, cluster management server 112 can identify which other query operators in the query plan tree are affected by the migration of join operator 206 from failed processing node 102(3) to new processing node 102(6), which causes new join operator instance 206" to begin execution from the last snapshot. Cluster management server 112 can then rollback the affected query operator instances to that snapshot. To the extent that one or more affected query operator instances are identified, cluster management server 112 can update those instances to point to the mailbox address of new join operator instance 206" (rather than old join operator instance 206').

While the cascading effect described above would appear to rollback the entire query to the previous snapshot, in practice the cascading may stop much earlier. For example, if old join operator instance 206' reached the probing phase prior to the generation of the last snapshot, cluster management server 112 can determine that the hash table of left-side entries in the snapshot (as received from scan operator instance 204') is complete. Cluster management server 112 can therefore conclude that there is no need to rollback scan operator instance 204' to the previous snapshot.

After determining the failure horizon, cluster management server 112 can resume execution of query plan 200 across processing nodes 102(1), 102(2), 102(4), 102(5), and 102(6) (block 808). In response, control engine 108(6) of new processing node 102(6) can load the snapshot for old join operator instance 206' from distributed data store 110 (block 810). Execution engine 106(6) can then begin execution of new join operator instance 206" from the snapshot state (block 812).

Dynamic Load Balancing Using Query Operator Motion

In addition to fault tolerance, the query operator motion capability of system environment 100 can enable dynamic load balancing between execution engines 106(1)-106(N)/processing nodes 102(1)-102(N) at query runtime. This can be useful for redistributing work among the processing nodes when compute/memory resources fluctuate, as well as for optimizing the original query operator scheduling that is determined by cluster management server 112 at the start of query plan execution.

For instance, assume that the optimizer component of cluster management server 112 initially determines, based on a statistical analysis of the input data for a given query, that it should schedule ten instances of a join operator on ten execution engines respectively. Further assume that, due to unexpected data skew, one or all of the ten join operator instances become overloaded at runtime. In this case, the existing join operator instances can be "split," such that their remaining workloads are divided into smaller portions. Some or all of the split portions can then be dynamically migrated to other, less heavily loaded execution engines/processing nodes. In this way, better balance among the processing nodes can be achieved and the overall processing time for the query can be reduced.

Figure 9:
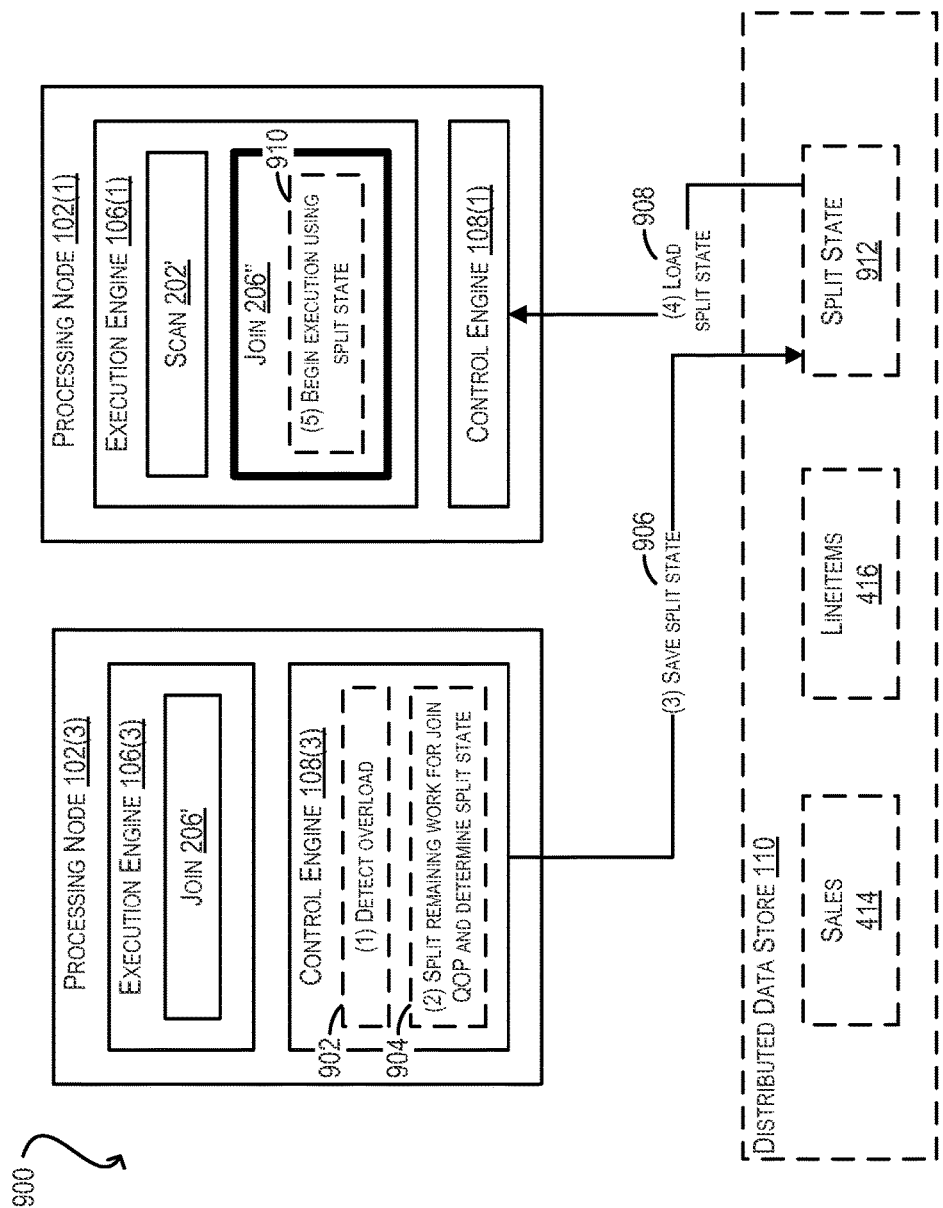
FIG. 9 depicts a flow for dynamically splitting a query operator according to one embodiment.

FIG. 9 depicts a flow 900 that can be executed during the query execution flow of FIG. 4 for dynamically load balancing work across execution engines/processing nodes according to an embodiment. In FIG. 9, it is assumed that join operator instance 206' running within execution engine 106(3) of processing node 102(3) has become overloaded.

At step (1) of flow 900 (reference numeral 902), control engine 108(3) of processing node 102(3) can detect an overload condition with respect to join operator instance 206'. For instance, control engine 108(3) can detect that the workload for join operator instance 206' is causing execution engine 106(3) to exceed a threshold level of memory consumption or a threshold level of CPU utilization. In some embodiments, in lieu of control engine 108(3), this detection can be performed by an entity external to processing node 102(3), such as cluster management server 112.

At step (2) (reference numeral 904), control engine 108(3) can determine an amount of remaining work to be performed by join operator instance 206'. For example, control engine 108(3) can determine that join operator instance 206' needs to complete construction of the left-side hash table. Control engine 108(3) can then split off a portion of the remaining work and determine a "split state"—in other words, state information that identifies the split portion. For instance, returning to the example above, control engine 108(3) can split the hash table in half (by, e.g., calculating hash key modulo 2) and can generate state information that identifies the second half. Once the split state is generated, control engine 108(3) can save the split state to distributed data store 110 as split state 912 (step (3), reference numeral 906).

Like the snapshots that are generated in the failure recovery scenario of FIG. 5, the split state that control engine 108(3) generates at step (2) of flow 900 can be specific to the type of the query operator instance being split. This optimization can minimize the amount of data that control engine 108(3) needs to write to distributed data store 110. The following table provides an exemplary list of query operator types and the state information that may be included in the split state for that type:

TABLE 2

Split State Information for Various Query Operator Types

| Query Operator Type | State Information |
|---|---|
| Select/Scan | The position (e.g., file offset) of the split segment. |
| Hash Join | If the hash table is split into N segments via a modulo function (e.g., hash key modulo N), the state information can identify one of the buckets (e.g., a value between 1 and N). |
| Aggregate (e.g., group by, sum, etc.) | In the case of a hash aggregate operation, the state information can identify a hash table bucket (same as hash join). Alternatively, can simply start multiple instances and then combine aggregate values (no split state information needed). |
| Sort | External sort has two phases, building runs and merging runs. The two phases can run in different execution engines, and thus in this case the state information can identify the phase. Each phase can also be split. |

At step (4) (reference numeral 908), the control engine for another, less heavily-loaded processing node in the cluster (e.g., control engine 108(1) of processing node 102(1)) can load split date 912 from distributed data store 110. The execution engine for that processing node (e.g., execution engine 102(1)) can then begin executing a new join operator instance 206" using the split state (step (5), reference numeral 912), thereby taking over that portion of the join operator workload from join operator instance 206' of processing node 102(3).

In the example of FIG. 9, the processing node that takes over the split workload (i.e., processing node 102(1)) is already executing another query operator instance in query plan 200 (i.e., scan operator instance 202'). In alternative embodiments, the split workload can be assumed by one or more entirely new processing nodes in system environment 100.

Further, although not shown in FIG. 9, in certain embodiments the workload for multiple instances of a given query operator can be merged, or consolidated, into a single instance (running in a single execution engine/processing node). This can be accomplished by applying a process that is substantially the converse of flow 900 (i.e., saving multiple "split" states to distributed data store 110 and then merging the multiple split states into a single state).

Figure 10:
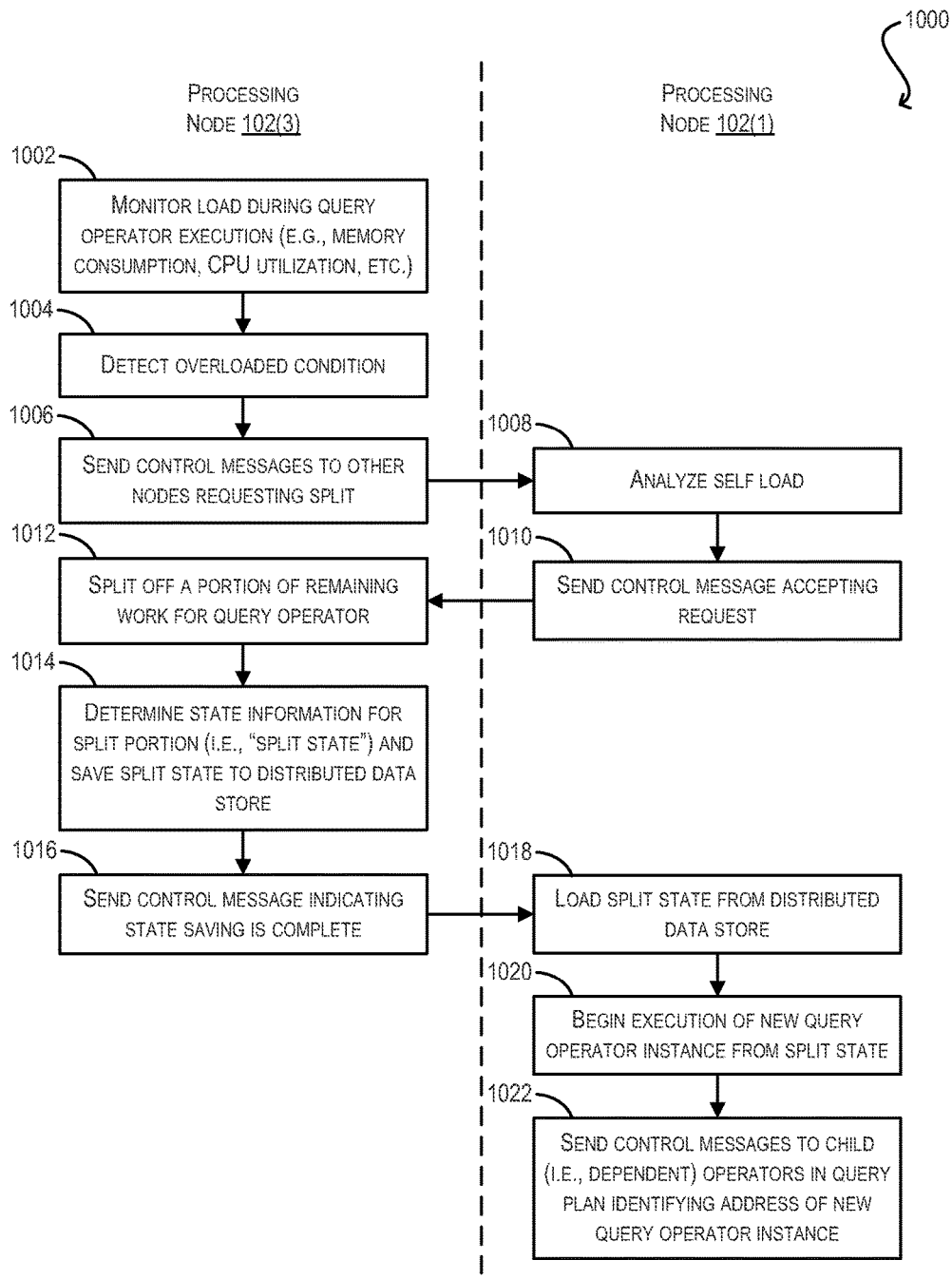
FIG. 10 depicts a flowchart that provides additional details regarding the flow of FIG. 9 according to one embodiment.

FIG. 10 depicts a flowchart 1000 that provides additional details regarding the load balancing scenario of FIG. 9 according to an embodiment. At block 1002, control engine 108(3) of processing node 102(3) can monitor the load of execution engine 106(3) while executing join operator instance 206'. This can include, e.g., monitoring memory consumption, CPU utilization, and/or other load metrics.

At blocks 1004 and 1006, control engine 108(3) can detect an overload condition based on the monitoring at block 1002 and can send control messages to other processing nodes in the same cluster requesting an operator split.

In response, control engine 108(1) of processing node 102(1) can receive the control message and analyze the current load of execution engine 106(1) (block 1008). If control engine 108(1) determines that execution engine 106(1) can take on a portion of the work from processing node 102(3), control engine 108(1) can send a reply message accepting the request (block 1010).

At block 1012, control engine 108(3) can receive the message from control engine 108(1) and can split of a portion of the remaining work for join operator instance 206'. Control engine 108(3) can then determine state information for the split portion (i.e., the split state), save the split state to distributed data store 110, and send a control message to control engine 108(3) indicating that state saving is complete (blocks 1014 and 1016).

Upon receiving the save completion message from control engine 108(3), control engine 108(1) can load the split state from distributed data store 110 (block 1018). Control engine 108(1) can subsequently begin execution of new join operator instance 206" based on the split state (block 1020). In certain embodiments, control engine 108(1) can also send control messages to child operator instances (e.g., scan operator instances 202' and 204') identifying the mailbox address of new query operator instance 206", thereby enabling those child operator instances to communicate input data to instance 206" (block 1022).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for performing dynamic load balancing during distributed query processing, the method comprising:
   executing, by a first processing node in a plurality of processing nodes, a first instance of a query operator, the query operator being part of a query plan for a database query that is processed in a distributed manner by the plurality of processing nodes;
   monitoring, by the first processing node, a load level of the first processing node while the executing of the first instance of the query operator occurs; and
   when the load level exceeds a threshold:
      splitting, by the first processing node, an amount of remaining work that is associated with the executing into a first portion and a second portion;
      determining, by the first processing node, state information usable for moving execution of the second portion from the first processing node to a second processing node, wherein:
         when the query operator is a select or scan operator, the state information comprises a pointer to a segment of an input file or a database table;
         when the query operator is a hash join or hash aggregate operator, the state information comprises a split portion of a hash table; and
         when the query operator is a sort operator, the state information comprises an identification of a building phase or a merging phase; and
      saving, by the first processing node, the state information to a distributed data store.

2. The method of claim 1 further comprising, by the second processing node:
   loading the state information from the distributed data store; and
   initiating execution of a second instance of the query operator based on the state information, such that the first and second portions of the remaining work are executed simultaneously on the first and second processing nodes respectively.

3. The method of claim 2 further comprising, by the second processing node:
   transmitting control messages to other processing nodes in the plurality of processing nodes, the other processing nodes being configured to execute instances of query operators that are children of the query operator in the query plan, the control messages identifying an address of the second instance of the query operator.

4. The method of claim 2 further comprising, subsequently to initiating execution of the second instance of the query operator on the second processing node:
   causing the second portion to be merged again with the first portion on the first processing node for execution via the first instance of the query operator.

5. The method of claim 1 further comprising, prior to determining the state information:
   transmitting a control message to the second processing node requesting that the second processing node take over partial execution of the query operator; and
   receiving a response from the second processing node accepting the request.

6. The method of claim 1 wherein the second processing node is selected by a management server associated with the plurality of processing nodes, the management server being configured to monitor load levels for each of the plurality of processing nodes during the processing of the query plan.

7. The method of claim 1 wherein the load level corresponds to memory consumption or CPU utilization of the first processing node.

8. A non-transitory computer readable storage medium having stored thereon computer software executable by a first processing node in a plurality of processing nodes, the computer software embodying a method comprising:
  executing a first instance of a query operator, the query operator being part of a query plan for a database query that is processed in a distributed manner by the plurality of processing nodes;
  monitoring a load level of the first processing node while the executing of the first instance of the query operator occurs; and
  when the load level exceeds a threshold:
    splitting an amount of remaining work that is associated with the executing into a first portion and a second portion;
    determining state information usable for moving execution of the second portion from the first processing node to a second processing node, wherein:
      when the query operator is a select or scan operator, the state information comprises a pointer to a segment of an input file or a database table;
      when the query operator is a hash join or hash aggregate operator, the state information comprises a split portion of a hash table; and
      when the query operator is a sort operator, the state information comprises an identification of a building phase or a merging phase; and
    saving the state information to a distributed data store.

9. The non-transitory computer readable storage medium of claim 8 wherein the second processing node is configured to:
  load the state information from the distributed data store; and
  initiate execution of a second instance of the query operator based on the state information, such that the first and second portions of the remaining work are executed simultaneously on the first and second processing nodes respectively.

10. The non-transitory computer readable storage medium of claim 9 wherein the second processing node is further configured to:
  transmit control messages to other processing nodes in the plurality of processing nodes, the other processing nodes being configured to execute instances of query operators that are children of the query operator in the query plan, the control messages identifying an address of the second instance of the query operator.

11. The non-transitory computer readable storage medium of claim 9 wherein the method further comprises, subsequently to initiating execution of the second instance of the query operator on the second processing node:
  causing the second portion to be merged again with the first portion on the first processing node for execution via the first instance of the query operator.

12. The non-transitory computer readable storage medium of claim 8 wherein the method further comprises, prior to determining the state information:
  transmitting a control message to the second processing node requesting that the second processing node take over partial execution of the query operator; and
  receiving a response from the second processing node accepting the request.

13. The non-transitory computer readable storage medium of claim 8 wherein the second processing node is selected by a management server associated with the plurality of processing nodes, the management server being configured to monitor load levels for each of the plurality of processing nodes during the processing of the query plan.

14. The non-transitory computer readable storage medium of claim 8 wherein the load level corresponds to memory consumption or CPU utilization of the first processing node.

15. A computer system comprising:
  a processor; and
  a non-volatile data store having stored thereon program code which, when executed by the processor, causes the processor to:
    execute a first instance of a query operator, the query operator being part of a query plan for a database query that is processed in a distributed manner by a plurality of computer systems;
    monitor a load level of the computer system while the executing of the first instance of the query operator occurs; and
    when the load level exceeds a threshold:
      split an amount of remaining work that is associated with the executing into a first portion and a second portion;
      determine state information usable for moving execution of the second portion from the computer system to a second computer system, wherein:
        when the query operator is a select or scan operator, the state information comprises a pointer to a segment of an input file or a database table;
        when the query operator is a hash join or hash aggregate operator, the state information comprises a split portion of a hash table; and
        when the query operator is a sort operator, the state information comprises an identification of a building phase or a merging phase; and
      save the state information to a distributed data store.

16. The system of claim 15 wherein the second computer system is configured to:
  load the state information from the distributed data store; and
  initiate execution of a second instance of the query operator based on the state information, such that the first and second portions of the remaining work are executed simultaneously on the computer system and the second computer system respectively.

17. The system of claim 16 wherein the second computer system is further configured to:
  transmit control messages to other computer systems in the plurality of computer systems, the other computer systems being configured to execute instances of query operators that are children of the query operator in the query plan, the control messages identifying an address of the second instance of the query operator.

18. The system of claim 16 wherein the program code further causes the processor to, subsequently to initiating execution of the second instance of the query operator on the second computer system:
  cause the second portion to be merged again with the first portion on the computer system for execution via the first instance of the query operator.

19. The system of claim 15 wherein the program code further causes the processor to, prior to determining the state information:
  transmit a control message to the second computer system requesting that the second computer system take over partial execution of the query operator; and receive a response from the second computer system accepting the request.

20. The system of claim 15 wherein the second computer system is selected by a management server associated with the plurality of computer systems, the management server being configured to monitor load levels for each of the plurality of computer systems during the processing of the query plan.

21. The system of claim 15 wherein the load level corresponds to memory consumption or CPU utilization of the first processing node.

* * * * *